April 11, 1967   W. G. FLANNELLY   3,313,163
GYROSCOPIC VIBRATION ABSORBER
Filed July 23, 1963   2 Sheets-Sheet 2

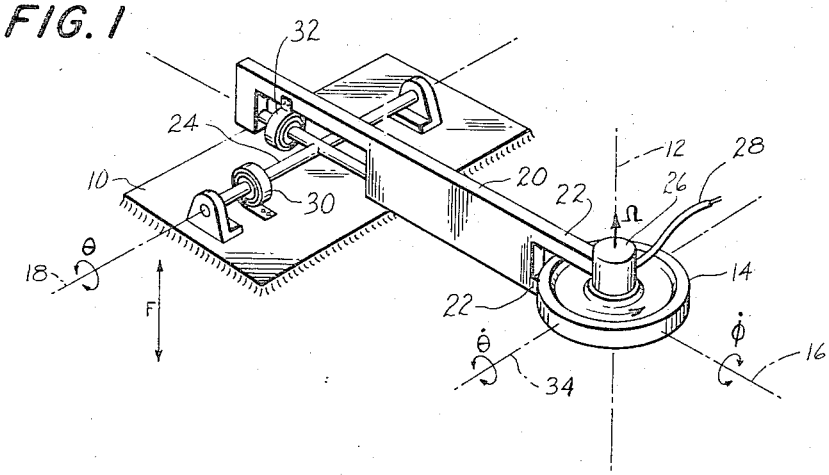
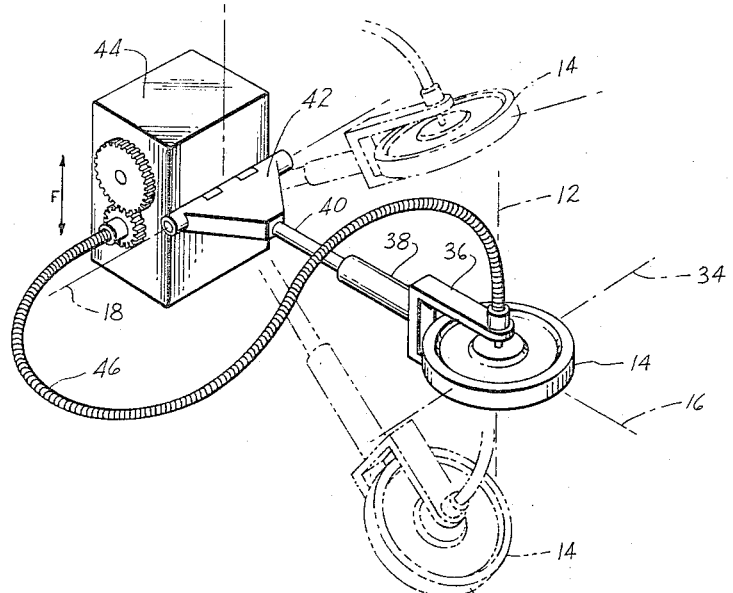

United States Patent Office 3,313,163
Patented Apr. 11, 1967

3,313,163
GYROSCOPIC VIBRATION ABSORBER
William G. Flannelly, South Windsor, Conn., assignor to Kaman Aircraft Corporation, Bloomfield, Conn., a corporation of Connecticut
Filed July 23, 1963, Ser. No. 297,017
18 Claims. (Cl. 74—5.22)

This invention relates to devices referred to as vibration absorbers for counteracting and reducing or attenuating vibratory motions set up in machines, engines, vehicles and similar structures, and deals more particularly with a vibration absorber employing gyroscopically induced moments and forces for counteracting said vibratory motions.

The general object of this invention is to provide a vibration absorber adapted for attachment to a machine or other structure to eliminate or attenuate vibrations and which absorber is self-tuning so as to have a maximum vibration attenuating effect at or near the momentary frequency of the vibration when the vibration is basically a simple harmonic motion or at or near the frequency of the predominant component of the vibration when the vibration is a more complex motion.

Another object of this invention is to provide a vibration absorber which is lighter in weight, and more effective than presently known absorbers of different construction, and which absorber is easy to design for a particular application and is applicable to a wide range of vibration problems.

A more particular object of the invention is to provide a vibration absorber which may be made from any of a number of different materials and which may therefore be used in environments in which other conventional absorbers are unacceptable.

Another object of this invention is to provide a vibration absorber having such a low weight as to make it possible to apply a number of such absorbers to one structure, such as an aircraft, for absorbing or attenuating various different harmonics of a complex vibration without incurring too great a weight penalty.

Still another object of this invention is to provide a vibration absorber wherein the usual problem of matching spring rate and strength requirements is avoided and wherein the problem of wide spring rate tolerance, common in all absorbers using elastic elements, affecting the tuning is also avoided.

A further object of this invention is to provide a vibration absorber which includes no springs or other device for storing a significant amount of strain energy and which absorber further includes no friction or dampening mechanisms for dissipating energy. In keeping with this object, a more particular object is to provide a vibration absorber which is a completely inertial device utilizing a gyroscopic mass and wherein the law of conservation of energy is satisfied by the fact that the sum of the kinetic energies about the nutational and precessional axes remains constant, the device when tuned to the exciting frequency of vibration exhibiting a 180° phase relationship between the kinetic energy of nutation and the kinetic energy of precession analogous to the phasing between the kinetic and potential energies in a simple spring-mass system.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a perspective view somewhat schematically illustrating a gyroscopic vibration absorber embodying the present invention.

FIG. 2 is a perspective view showing a vibration absorber comprising a slightly different embodiment of the invention, the restoring springs having been omitted for purposes of clarity.

Figure 3:
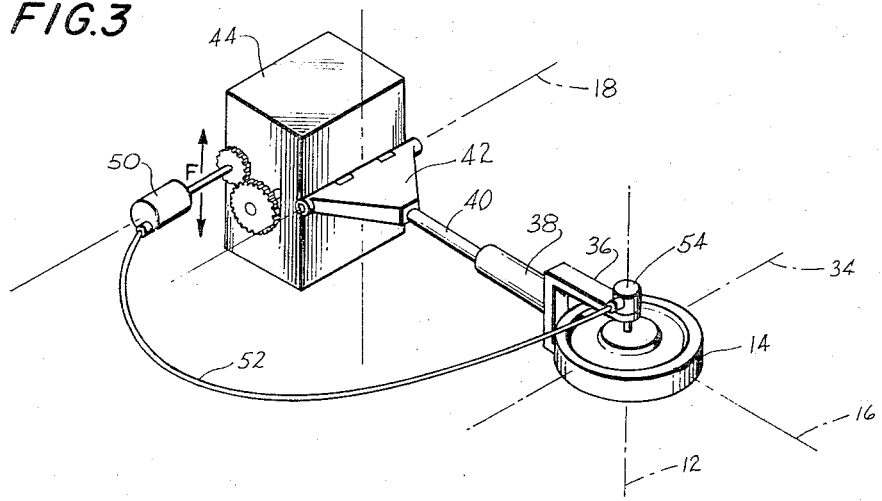
FIG. 3 is a perspective view generally similar to FIG. 2 but showing a slightly different embodiment of the invention.

FIGURE 1 shows schematically a gyroscopic vibration absorber embodying the present invention, the absorber being attached to a structure 10 having translatory vibratory movements occurring in the vertical direction as indicated by the direction line F. As shown in FIG. 1, the vibration absorber comprises a rotatable or gyroscopic mass which is supported for rotation about a spin axis 12. The mass is preferably balanced about the spin axis 12 so as to produce no centrifugally derived unbalanced forces as a result of this rotation. The mass also is conveniently in the form of a disc 14 having its weight concentrated in its rim, but it is to be understood that different shapes may be given to the mass without departing from the invention.

The spin axis 12 of the disc 14 is rotatable about a first axis 16 disposed generally perpendicular to the spin axis and as shown in FIG. 1 and in the other figures of this application, the said first axis 16 is so located as to intersect the spin axis at the center of gravity of the disc 14. Such intersection of the spin axis with the first axis and with the center of gravity of the disc is preferred but not entirely essential. The first axis 16 is in turn supported for rotation about a second axis 18 which is fixed relative to the vibrating structure 10 and which is sometimes referred to hereinafter as the fixed axis.

In the structure of FIG. 1, the spin axis 12 is fixed relative to a supporting arm 20 with the disc 14 being rotatably supported on the outer end of the arm 20 between two smaller arms or forks 22, 22. The arm 20 is in turn supported relative to the vibrating structure 10 by a cross member 24 having two colinear arms rotatably connected with the arm 20 and two other colinear arms rotatably connected with the vibrating structure 10. The two arms of the cross member 24 which are rotatably connected with the arm 20 define and locate the first axis 16 and the two arms which are rotatably connected with the structure 10 define and locate the fixed axis 18. Since the axis 16 passes through the center of gravity of the disc 14 it is also the axis about which the disc precesses as a result of tilting movements of the spin axis occurring in the plane containing the spin axis 12 and the first axis 16. As will hereinafter be more evident, such tilting movements of the spin axis are produced by the vibratory movements of the structure 10 and therefore in the illustrated absorber of FIG. 1, as well as in the other illustrated absorbers, the axis 16 may be considered to be a precessional axis. Nevertheless, it should be understood that in accordance with the broader aspects of the invention, the axis 16 need not always pass through the center of gravity of the disc so as to coincide with the precessional axis and the axis 16 may, if desired, be spaced some distance from the precessional axis.

In actual use of the absorber, the gyroscopic disc 14 is rotated about the spin axis 12, and various different means may be used to effect this rotation. In FIG. 1 this means is shown to consist of a synchronous motor 26 which is carried by one of the small arms 22 and drivingly connected with the disc 14, the motor 26 being supplied with electrical power from an associated flexible power line 28.

In FIG. 1 the various parts of the illustrated vibration absorber are shown in their normal positions, which normal positions are occupied when the vibrating structure 10 is at rest or at least undergoing no vibrational movements. When the parts are in such normal positions, the plane of rotation of the disc 14 is generally parallel with the fixed axis 18 and the spin axis 12 is oriented generally vertically or parallel to the direction line F of the translatory vibrating movements. Also, the arrangement of the parts are such that the combined center of gravity of the parts which rotate about the fixed axis 18 is some distance from said latter axis with the result that translational movement of the fixed axis 18 in any plane, except a plane passing through such center of gravity, produces an inertial moment moving or tending to move the arm 20 about the axis 18. Preferably, and as shown, such location of said combined center of gravity is provided by locating the spin axis 12 some distance from the fixed axis 18 so that the disc 14 contributes a significant amount of unbalanced mass located on one side of the axis 18. This arrangement is not, however, entirely necessary and, if desired, the spin axis may be so located as to intersect the fixed axis with a separate unbalancing weight being provided to shift the center of gravity from the fixed axis.

Biasing or restoring means are employed to bias or restore the parts to the illustrated normal positions, but such biasing or restoring means are such as to present little or no opposition to free movement of the various parts of the absorber as a result of gyroscopic forces and moments imposed thereon when the absorber is excited by the vibration of the structure 10. For example, if springs are employed as the biasing means, these springs should have very low spring rates so that the change in the spring forces produced by the relative movement of the parts of the absorber will be quite small in comparison to the forces and moments produced by the gyroscopic action of the disc 14. More particularly, the biasing or restoring means are used solely to establish the normal or steady state positions of the parts of the absorber and are not germane to the operating principles of the absorber in that they are not used to store and release any signficant amount of strain energy in the same manner as does the spring of a conventional spring-mass type absorber. Various different low rate biasing or restoring means may be employed in the absorber, and as shown in FIG. 1 these means consist of two clock or helical torsion springs 30, 32. The spring 30 is received on one arm of the cross member 24, which arm is colinear with the fixed axis 18, and is connected at its inner end to said arm and at its outer end to the vibrating structure 10. The preload on this spring is such that during an at-rest condition of the vibrating structure, it exerts a spring moment on the associated arm of the cross member 24 sufficient to balance the gravity induced moment exerted on the cross member by the arm 20, the arm 20 therefore being held in the horizontal position shown. The clock spring 32 is received on one of the arms of the cross member 24 which is colinear with the first axis 16 and is connected at its inner end of the latter arm and at its outer end to the arm 20. The arm 20 and its associated parts are preferably balanced about the first axis 16 and during an at-rest condition of the vibrating structure 10, the clock spring 32 serves to hold the arm 20 in the illustrated position whereat the spin axis 12 is vertical or parallel with the vertically orientated translatory vibrating movements.

It should at this point be understood that the desired normal positions of the parts are dependent on the orientation or direction of the vibratory movements of the vibrating structure and that the biasing of the parts to the normal positions is necessary only to assure that the absorber will be brought into operation when the associated structure 10 is brought into a state of vibration after a period of rest or no vibrations. After the absorber is brought into operation, the biasing means serve no particular purpose, and in cases where the absorber is used with a machine or structure which runs continuously for long periods, it may be desirable to omit the biasing means, the parts of the absorber being held by hand in the desired normal positions during the start-up of the machine or other structure. Preferably, the normal positions are such that the fixed axis 18 is perpendicular to the direction line F of the vibratory movements and the spin axis 12 is parallel to said direction line F. These preferred normal positions are not, however, essential. As will be apparent hereinafter, the absorber will not operate properly if the spin axis is parallel to the fixed axis or if the combined center of gravity of the parts which rotate about the fixed axis is so located that the plane of the translatory movement of the first axis passes through the center of gravity. It is sufficient to the operation of the absorber that the biasing means urge the parts toward normal positions whereat the spin axis and combined center of gravity are located otherwise than at these critical positions.

Considering now the operation of the absorber illustrated in FIG. 1, assume that vertically oriented translational vibratory movement is imparted to the structure 10 as indicated by the direction line F. Assume also that the gyroscopic disc 14 is being driven by the synchronous motor 26 at a constant angular velocity $\Omega$. As the structure 10 vibrates vertically, the static moment of the absorber about the fixed axis 18 causes the arm 20 to oscillate about the fixed axis 18 through the angle $\theta$. This in turn causes an angular velocity $\dot{\theta}$ about and axis 34, hereinafter referred to as the nutational axis, parallel to the fixed axis 18 and passing through the center of gravity of the disc 14. This velocity $\dot{\theta}$ causes the gyroscopic disc 14 to precess at the rate $\dot{\phi}$ about a precessional axis (in this case coincident with the first axis 16) perpendicular to the spin and nutational axes, this in turn causing a resultant gyroscopic moment about the nutational axis 34 which resists the angular velocity $\dot{\theta}$. This gyroscopic moment in turn exerts a vertically directed force through the cross member 24 to the structure 10 resisting the exciting vibrational movement F. The uncoupled natural frequency of the absorber about the fixed axis 18 is a function of the gyroscopic restoring moment produced about the nutational axis 34, and this gyroscopic moment is a function of the disc angular velocity $\Omega$. The abosrber can therefore be tuned to any excitation frequency by changing the angular velocity $\Omega$ of the disc. That is, the absorber is a tuned device and for a given disc speed operates to attentuate one excitation frequency. Nevertheless, since the disc speed may be readily changed, the absorber can be used for any frequency of excitation by simply changing the disc speed.

Figure 4:
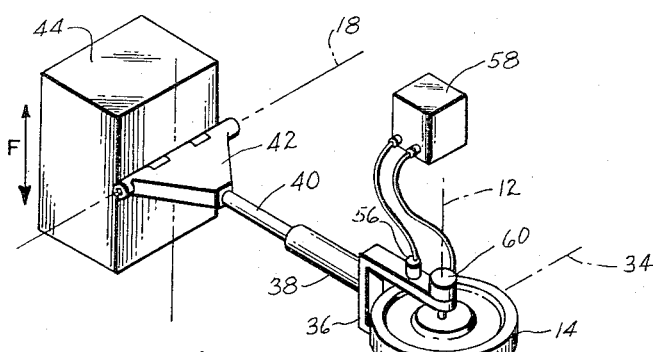
FIG. 4 is a perspective view generally similar to FIG. 2 but showing still another embodiment of the invention.

FIGS. 2, 3 and 4 illustrate various different ways in which the gyroscopic disc may be controlled in speed to cause the absorber to be continuously tuned to the exciting frequency of vibration. These figures also show a slightly different construction of the vibration absorber and FIG. 2, in its broken line showings, illustrates the positions occupied by the gyroscopic disc at various instants during a cycle of its movements. Considering first the structure of the absorber shown in FIGS. 2, 3 and 4, these absorbers utilize the same relationship of axes as provided by the absorber in FIG. 1 and these axes are therefore identified by the same reference numerals as used in the FIG. 1 illustration. In the absorber of FIGS. 2, 3 and 4, the gyroscopic mass is supported for rotation about the spin axis between two arms of a U-shaped member 36 having attached thereto a tubular arm 38.

Figure 5:
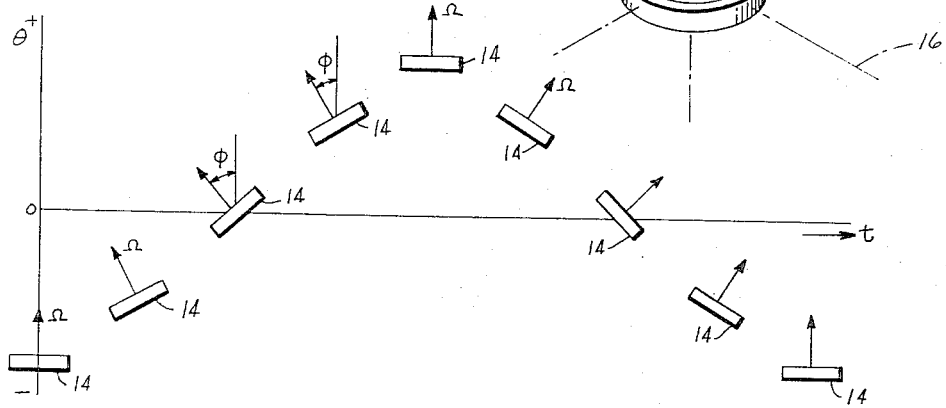
FIG. 5 is a graphical presentation showing the orientation of the gyroscopic disc of the FIGS. 1, 2, 3 or 4 absorber at various points throughout one cycle of operation.

The tubular arm 38 is rotatably supported on, and restrained against longitudinal movement relative to, another arm 40. Relative rotation between the two arms occurs about the axis 16. The arm 40 is fixed relative to a part 42 which is connected with the vibrating structure 44 for pivotal movement about the fixed axis 18. Referring particularly to FIG. 2, the two broken line illustrations of the absorber illustrate the position of the disc when at the limits of its swinging movement about the fixed axis 18. At both of these limit positions, the plane of rotation of the gyro disc is generally parallel to the fixed axis 18. In FIGS. 1, 2, 3 and 4, the solid line illustration of the absorber shows the gyro disc in the position assumed during an at-rest condition of the vibrating structure. During this at-rest condition of the vibrating structure, the gyro disc is held in the normal position shown by suitable low rate springs or other biasing means, such as the clock springs 30 and 32 of FIG. 1, which have been omitted from FIGS. 2, 3 and 4 for reasons of clarity. During operation of the absorber, however, the plane of rotation of the gyroscopic disc will not be normal to the fixed axis 18 as the latter moves past the horizontal or mid position of its movement, and instead the gyroscopic disc will be rotated about the precessional axis a maximum amount $\phi_{max}$ each time the gyroscopic disc passes the mid position of its swinging movement about the fixed axis 18. When moving past the mid position during downward movement of the gyroscopic disc, the gyroscopic disc will be rotated a maximum amount in one direction about the precessional axis 16 and while moving upwardly and past the mid position, the disc will be rotated a maximum amount in the opposite direction about the precessional axis 16. The nature of the movement of the disc is best shown by FIG. 5 which shows the displacement of the disc about the fixed axis 18 and the axis 16 at various points throughout one cycle of operation. The movement of the gyroscopic disc is seen from FIG. 5 to be made up of two simple harmonic motions, one of such motions being the swinging movement of the disc about the fixed axis 18 and the other such movement being the rotation of the disc about the axis 16. When the speed of the gyroscopic disc is tuned to the vibrational frequency of the vibrating structure, the motion of the disc is as described wherein it will be noted that the kinetic energies of the gyroscopic disc about the fixed axis 18 and about the precessional axis 16 are 180° out of phase relative to one another, the situation being analogous to the phasing between the kinetic and potential energies in a simple spring-mass resonant system.

FIGS. 2 and 3 illustrate two alternative methods for synchronizing the speed of the gyroscopic disc with the exciting frequency of the vibrating structure in situations where the exciting frequency is a harmonic of the rotational speed of a shaft or other rotating part. This could be the case, for example, in automobiles, aircraft, ships, machine tools, etc., where the frequency of the undesired vibration is often related harmonically to the frequency or rotational speed of the drive shaft. In the FIG. 2 construction the gyroscopic disc is directly mechanically coupled with one of the rotating shafts of the vibrating structure 44 by means of a flexible shaft 46 which is drivingly connected at one end to the gyroscopic disc and at the other end to the rotating shaft.

In the structure of FIG. 3 the gyroscopic disc 14 is driven in synchronism with one of the rotating shafts of the vibrating structure by means of a generator 50 which as shown is driven by the rotating shaft. The generator 50 produces an output voltage having a frequency related to the speed of rotation of the driving shaft and this output voltage is in turn conducted by a line 52 to a synchronous motor 54 attached to one of the arms of the U-shaped member 36 of the absorber. The synchronous motor 54 rotates the gyroscopic disc at a speed determined by the frequency of the voltage appearing on the line 52 and accordingly the disc speed is directly related to the speed of the driving shaft.

For single frequency excitation from sources other than rotating machinery, that is in cases where the exciting frequency is not related to the speed of a rotating shaft, a vibration transducer may be employed to detect the frequency of the exciting vibration and to control a drive motor for the gyroscopic disc so that the motor is driven at a speed related to the exciting frequency. Such an arrangement is shown in FIG. 4 wherein a vibration transducer 56 is located on the U-shaped member 36 of the vibration absorber. The output of the transducer 56 is transmitted to a control device 58 which amplifies the signals of the transducer and converts the same into an alternating driving voltage supplied to a synchronous motor 60 also located on the U-shaped member 36 for driving the gyro disc. Where the exciting vibration is basically of a simple harmonic nature, the control device is preferably adapted to control the frequency of the driving voltage in such a manner that the gyroscopic disc is driven at the proper speed to produce its maximum vibration attenuating effect at the particular exciting frequency in question. Where more complex vibrations are involved, the control device is preferably adapted to cause the gyroscopic disc to be driven at such a speed as to produce a maximum attenuating effect at or near the frequency of the predominant component of the vibration.

Where complex vibrations are encountered, it is also possible to employ a number of vibration absorbers constructed in accordance with the present invention and each having the speed of its gyroscopic disc controlled so as to have a maximum attenuating effect at a respective one of the harmonics of the vibration. The present absorber is particularly well adapted to such use because a relatively large absorbing effect can be produced by an absorber having a relatively small weight or mass. Therefore, in many instances a number of absorbers may be used on one vibrating structure to attenuate various different harmonics of the vibration without incurring too great a weight penalty.

The invention claimed is:

1. A vibration absorber comprising a mass, and means supporting said mass for rotation about a spin axis which spin axis is rotatable about a first axis generally perpendicular to said spin axis and which first axis is in turn rotatable about a second axis generally perpendicular to said first axis and spaced from said spin axis.

2. A vibration absorber as defined in claim 1 further characterized by said first axis being arranged to intersect said spin axis and said second axis being arranged to intersect said first axis.

3. A vibration absorber as defined in claim 2 further characterized by said mass having its center of gravity located at the intersection of said spin axis and said first axis.

4. A vibration absorber as defined in claim 1 further characterized by means for fixing said second axis relative to a vibrating structure.

5. A vibration absorber as defined in claim 1 further characterized by means for rotating said mass about said spin axis.

6. A vibration absorber comprising a mass, means supporting said mass for rotation about a spin axis which spin axis is rotatable about a first axis generally perpendicular to said spin axis and which first axis is in turn rotatable about a second axis generally perpendicular to said first axis and spaced from said spin axis, means for fixing said second axis relative to a vibrating structure, means for rotating said mass about said spin axis, and means for controlling the angular velocity of said mass about said spin axis in response to the frequency of the vibration of said vibrating structure.

7. A vibration absorber as defined in claim 6 further characterized by said means for rotating said mass about said spin axis comprising a synchronous motor, and said means for controlling the angular velocity of said mass about said spin axis comprising a transducer for converting the vibration of said structure into an electrical signal having a characteristic related to the frequency of said vibration, and means responsive to said vibration frequency-related characteristic of said electrical signal for controlling the speed of said synchronous motor.

8. A vibration absorber as defined in claim 6 further characterized by said means for rotating said mass about said spin axis comprising a synchronous motor, and said means for controlling the angular velocity of said mass about said spin axis comprising an alternating current electric generator driven by a rotating part of said vibrating structure so as to have an output voltage with a frequency related to the angular velocity of said rotating part and which frequency controls the speed of said synchronous motor.

9. A vibration absorber comprising a first part, a mass carried by said first part and rotatable relative thereto about a spin axis fixed relative to said first part, a second part connected with said first part and rotatable relative to said first part about a first axis generally perpendicular to said spin axis, and means for mounting said second part to a vibrating structure so that said second part may rotate about an axis fixed relative to said vibrating structure and orientated generally perpendicular to said first axis, the various parts of said absorber which rotate about said fixed axis being so shaped and arranged that their combined center of gravity is spaced from said fixed axis, and said spin axis being spaced from said fixed axis.

10. The combination with a structure undergoing translatory vibrations occurring parallel to a given direction line of a vibration absorber comprising a first part rotatable relative to said structure about an axis fixed relative to said structure and orientated at an angle to said direction line of said vibrations, a second part connected with said first part for rotation about a first axis orientated generally perpendicular to said fixed axis, a gyroscopic mass supported by said second part for rotation about a spin axis orientated generally perpendicular to said first axis, and means for rotating said gyroscopic mass about said spin axis, the various parts of said absorber which rotate about said fixed axis having a combined center of gravity spaced from said fixed axis, and said fixed axis being spaced from said spin axis.

11. The combination with a structure undergoing translatory vibrations occurring parallel to a given direction line of a vibration absorber comprising a first part rotatable relative to said structure about an axis fixed relative to said structure and orientated at an angle to said direction line of said vibrations, a second part connected with said first part for rotation about a first axis orientated generally perpendicular to said fixed axis, a gyroscopic mass supported by said second part for rotation about a spin axis orientated generally perpendicular to said first axis, means for rotating said gyroscopic mass about said spin axis, the various parts of said absorber which rotate about said fixed axis having a combined center of gravity spaced from said fixed axis, biasing means between said first and second part for biasing said second part about said first axis toward a given position relative to said first part whereat said spin axis is at an angle with said fixed axis, and biasing means between said first part and said structure for biasing said first part about said fixed axis toward a given position relative to said structure whereat said first axis is at an angle with said direction line.

12. The combination with a structure undergoing translatory vibrations occurring parallel to a given direction line of a vibration absorber comprising a first part rotatable relative to said structure about an axis fixed relative to said structure and orientated generally perpendicular to said direction line of said vibrations, a second part connected with said first part for rotation about a first axis passing through and generally perpendicular to said fixed axis, a gyroscopic mass supported by second part for rotation about a spin axis passing through and generally perpendicular to said first axis, and means for rotating said gyroscopic mass about said spin axis, the various parts of said absorber which rotate about said fixed axis having a combined center of gravity spaced from said fixed axis, and said spin axis being spaced from said fixed axis along said first axis.

13. A vibration absorber comprising a first part, a mass carried by said first part and rotatable relative thereto about a spin axis fixed relative to said first part, a second part connected with said first part and rotatable relative to said first part about a first axis generally perpendicular to said spin axis, and means for mounting said second part to a vibrating structure so that said second part may rotate about an axis fixed relative to said vibrating structure and orientated generally perpendicular to said first axis, the various parts of said absorber which rotate about said fixed axis being so shaped and arranged that their combined center of gravity is spaced from said fixed axis, and said mass having its center of gravity located on said spin axis and said first axis being so located as to intersect said spin axis at said center of gravity.

14. A vibration absorber comprising a first part, a mass carried by said first part and rotatable relative thereto about a spin axis fixed relative to said first part, a second part connected with said first part and rotatable relative to said first part about a first axis generally perpendicular to said spin axis, means for mounting said second part to a vibrating structure so that said second part may rotate about an axis fixed relative to said vibrating structure and orientated generally perpendicular to said first axis, the various parts of said absorber which rotate about said fixed axis being so shaped and arranged that their combined center of gravity is spaced from said fixed axis, and means for rotating said mass about said spin axis at a speed related to the frequency of the vibration of said vibrating structure.

15. A vibration absorber comprising a first part, a mass carried by said first part and rotatable relative thereto about a spin axis fixed relative to said first part, a second part connected with said first part and rotatable relative to said first part about a first axis generally perpendicular to said spin axis, means for mounting said second part to a vibrating structure so that said second part may rotate about an axis fixed relative to said vibrating structure and orientated generally perpendicular to said first axis, the various parts of said absorber which rotate about said fixed axis being so shaped and arranged that their combined center of gravity is spaced from said fixed axis, means for biasing said first part toward a given position about said first axis relative to said second part, and means for biasing said second part toward a given position about said fixed axis relative to said vibrating structure.

16. A vibration absorber as defined in claim 15 further characterized by both of said biasing means having a change in bias force versus displacement characteristic such that the changes in bias force produced during use of the absorber are small in comparison to the gyroscopically induced forces producing the displacements.

17. A vibration absorber as defined in claim 15 further characterized by said two biasing means each comprising a helical torsion spring.

18. The combination with a structure undergoing translatory vibrations occurring parallel to a given direction line of a vibration absorber comprising a first part rotatable relative to said structure about an axis fixed relative to said structure and orientated at an angle to said direction line of said vibrations, a second part connected with said first part for rotation about a first axis orientated generally perpendicular to said fixed axis, a gyroscopic mass supported by said second part for rotation about a spin axis orientated generally perpendicular to said first axis, and means for rotating said gyroscopic mass about said spin axis, the various parts of said absorber which rotate about said fixed axis having a combined center of gravity spaced from said fixed axis, and said means for rotating said gyroscopic mass including means for controlling the speed of rotation of said mass in response to the frequency of said translatory vibrations.

References Cited by the Examiner

UNITED STATES PATENTS 1,147,272  7/1915  Sears _____ 74—5.22 X

FOREIGN PATENTS 804,026  10/1936  France.

FRED C. MATTERN, JR., *Primary Examiner.*

MILTON KAUFMAN, *Examiner.*

J. D. PUFFER, *Assistant Examiner.*